United States Patent
Fukui et al.

(10) Patent No.: US 7,952,297 B2
(45) Date of Patent: May 31, 2011

(54) DRIVING DEVICE FOR PROVIDING LIGHT DIMMING CONTROL OF LIGHT-EMITTING ELEMENT

(75) Inventors: Hiroyuki Fukui, Kyoto (JP); Kazuaki Kitaga, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 369 days.

(21) Appl. No.: 12/179,868

(22) Filed: Jul. 25, 2008

(65) Prior Publication Data

US 2009/0058318 A1    Mar. 5, 2009

(30) Foreign Application Priority Data

Jul. 27, 2007  (JP) .................................. 2007-195845
Jul. 1, 2008   (JP) .................................. 2008-172620

(51) Int. Cl.
    *H05B 41/16* (2006.01)
(52) U.S. Cl. ..................... 315/247; 315/185 S; 315/291; 315/309; 315/312

(58) Field of Classification Search .................. 315/247, 315/246, 224, 225, 185 S, 274–279, 291, 315/307–326
See application file for complete search history.

(56) References Cited

U.S. PATENT DOCUMENTS

| | | | |
|---|---|---|---|
| 7,206,015 B2 * | 4/2007 | Tang et al. ..................... | 347/247 |
| 7,262,584 B2 * | 8/2007 | Crawford et al. ............. | 323/272 |
| 2006/0022918 A1 * | 2/2006 | Tang et al. ........................ | 345/84 |
| 2007/0159750 A1 * | 7/2007 | Peker et al. ................... | 361/93.1 |
| 2007/0268239 A1 * | 11/2007 | Lin et al. ......................... | 345/102 |
| 2008/0079371 A1 * | 4/2008 | Kang et al. ..................... | 315/309 |

FOREIGN PATENT DOCUMENTS

JP          2006-324671          11/2006

* cited by examiner

*Primary Examiner* — Tuyet Thi Vo
(74) *Attorney, Agent, or Firm* — Fish & Richardson P.C.

(57) ABSTRACT

A driving device includes a first switch element to switch between applying or not applying to a light-emitting element a voltage directed to setting the light-emitting element in an ON state, and a constant current control circuit to adjust a current flowing through the light-emitting element when the light-emitting element is in an ON state to a predetermined current value.

5 Claims, 3 Drawing Sheets

DRIVING DEVICE FOR PROVIDING LIGHT DIMMING CONTROL OF LIGHT-EMITTING ELEMENT

BACKGROUND OF THE INVENTION

1. Field of the Invention

The present invention relates to driving devices, particularly a driving device for providing light dimming control of a light-emitting element.

2. Description of the Background Art

Illumination devices such as incandescent lamps and streetlight employing light-emitting elements such as an LED (Light Emitting Diode) are developed.

As a method of adjusting the light of a light-emitting element, PWM (Pulse Width Modulation) control of the luminance of an LED is known. This method is directed to adjusting the luminance of an LED by altering the pulse width (time width) of the current flowing through the LED, i.e. by altering the duty of the pulse of the current flowing through the LED.

For example, Japanese Patent Laying-Open No. 2006-324671 (Patent Document 1) discloses an LED driving circuit set forth below. The LED driving circuit includes a PWM driving unit providing a switching pulse having the width adjusted by the voltage detected from a voltage detection resistor to a switch to control the ON/OFF time of the switch, a comparison unit comparing the voltage value detected by the voltage detection resistor and an arbitrary dimming voltage value, and a PWM control unit generating a control signal to increase and reduce the ON time of the switching pulse output from the PWM driving unit when the comparison voltage value from the comparison unit is increased and decreased, respectively. The luminance of the LED is adjusted by controlling the switching pulse width output from the PWM driving unit according to the dimming voltage value.

In the LED driving circuit of Patent Document 1, the current flowing through the LED will not be constant even in the case where the dimming voltage is maintained constant if the properties such as the LED forward voltage and color temperature vary. Therefore, this LED driving circuit is disadvantageous in that the luminance and chromaticity will vary.

SUMMARY OF THE INVENTION

An object of the present invention is to provide a driving device that can suppress variation in the luminance and chromaticity of a light-emitting element, irrespective of variation in the property of the light-emitting element.

A driving device according to an aspect of the present invention drives a light-emitting element. The driving device includes a first switch element to switch between applying or not applying to the light-emitting element a voltage directed to setting the light-emitting element in an ON state, and a constant current control circuit to adjust a current flowing through the light-emitting element when the light-emitting element is in an ON state to a predetermined current value.

Preferably, the driving device further includes a first voltage conversion circuit having a second switch element to generate a direct-current voltage directed to setting the light-emitting element in an ON state from an alternating voltage in response to alternate switching of the second switch element between an ON state and an OFF state. The constant current control circuit adjusts the current flowing through the light-emitting element when the light-emitting element is in an ON state to the predetermined current value by control of the ON state and OFF state of the second switch element.

More preferably, the driving device further includes a PWM control circuit to PWM-control the ON state and OFF state of the first switch element, and a second voltage conversion circuit to convert the direct-current voltage to a predetermined voltage value to be applied to the PWM control circuit as a power supply voltage.

More preferably, the constant current control circuit includes a first resistor connected in series with the first switch element, a second resistor connected parallel with a series circuit of the first switch element and the first resistor, a third resistor connected in series with the second resistor, and also connected in series with the series circuit of the first switch element and the first resistor, a current setting resistor connected between the third resistor and a node to which a predetermined voltage is applied, and a voltage control circuit controlling an ON state and OFF state of the second switch element based on a voltage at a first connection node of the second resistor and the third resistor, and a voltage at a second connection node of the third resistor and the current setting resistor. The series circuit of the second resistor and the third resistor is connected parallel with the light-emitting element. The direct-current voltage generated by the first voltage conversion circuit is supplied to a third connection node of the light-emitting element, the series circuit of the first switch element and the first resistor, and the second resistor.

More preferably, the voltage control circuit controls the ON state and OFF state of the second switch element such that the voltage at the first connection node attains a first predetermined voltage, and the voltage at the second connection node attains a second predetermined voltage.

More preferably, the current setting resistor is a thermistor.

More preferably, the constant current control circuit further includes a resistor connected parallel with the thermistor.

Preferably, the constant current control circuit includes a light dimming circuit to modify the predetermined current value according to ambient temperature.

Preferably, the driving device further includes a PWM control circuit to PWM-control an ON state and OFF state of the first switch element.

According to the present invention, variation in the luminance and chromaticity of the light-emitting element can be suppressed, irrespective of variation in the light-emitting element property.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
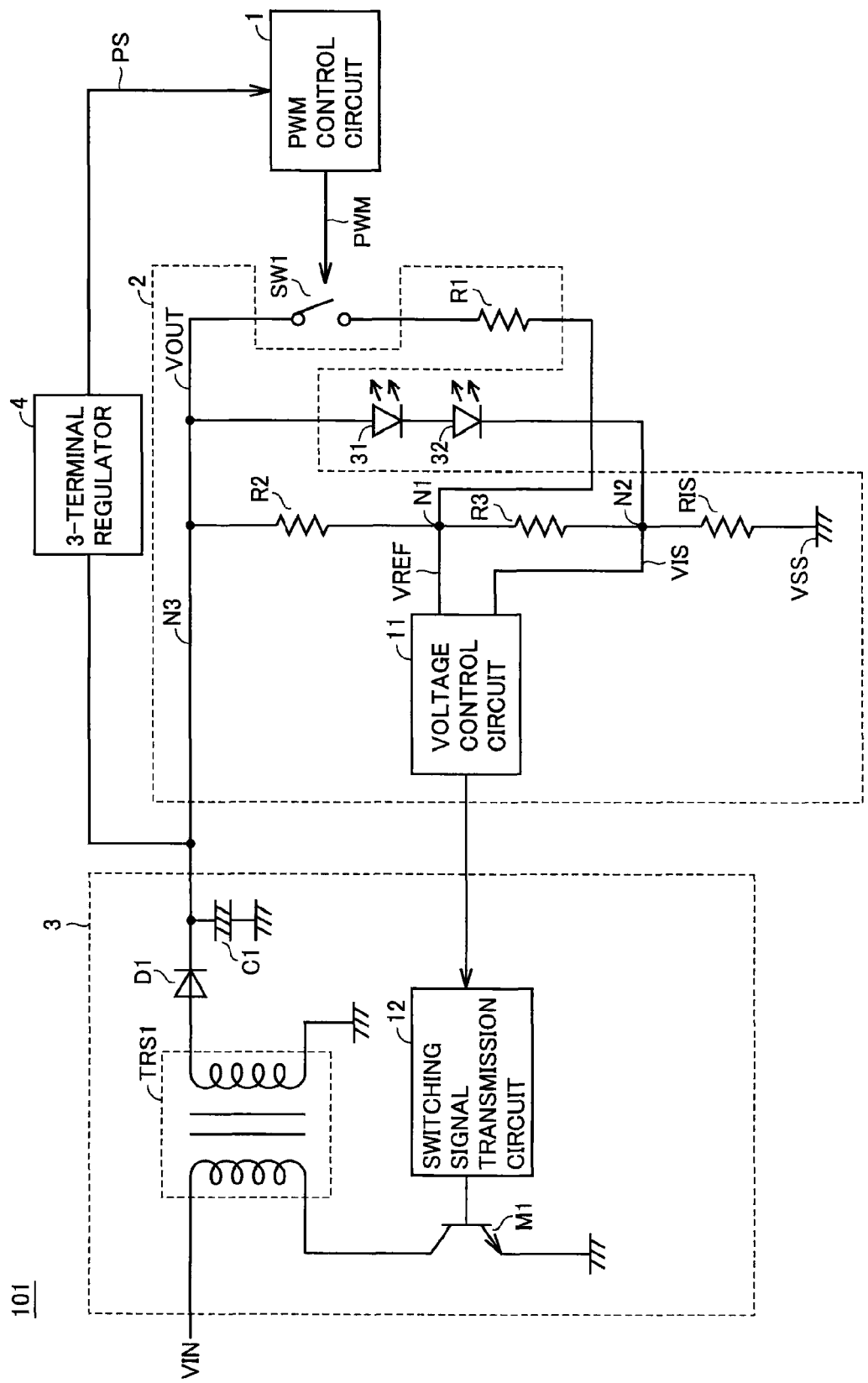
FIG. 1 is a functional block diagram of a configuration of a driving device according to a first embodiment of the present invention.

Embodiments of the present invention will be described hereinafter. In the drawings, the same or corresponding ele-

First Embodiment

[Configuration and Basic Operation]

FIG. 1 is a functional block diagram of a configuration of a driving device according to a first embodiment of the present invention.

Referring to FIG. 1, a driving device 101 includes a PWM control circuit 1, a constant current control circuit 2, a voltage conversion circuit 3, a 3-terminal regulator (voltage conversion circuit) 4, LEDs 31 and 32, and a switch element SW1. Constant current control circuit 2 includes resistors R1, R2 and R3, a current setting resistor RIS, and a voltage control circuit 11. Voltage conversion circuit 3 includes a switching signal transmission circuit 12, a transistor (switch element) M1, a transformer TRS1, a diode D1, and a capacitor C1. Driving device 101 may be configured excluding LEDs 31 and 32. In other words, a configuration may be employed in which LEDs 31 and 32 are arranged outside driving device 101.

Switch element SW1 is, for example, a bipolar transistor, a MOS transistor, a relay, a photocoupler, or a thyrister.

PWM control circuit 1 is, for example, a microcomputer. PWM control circuit 1 provides a PWM control signal to switch element SW1 for PWM-controlling the ON state and the OFF state of switch element SW1. PWM control circuit 1 determines the duty of the PWM control signal based on the detected result from, for example, an infrared sensor, a human-detection sensor, or an optical sensor not shown, as well as the user's operation on the volume, remote controller, and the like. As an alternative to PWM control circuit 1, a circuit may be employed providing a signal of a logical high level and logical low level such as a timer IC (Integrated Circuit).

Switch element SW1 responds to a PWM control signal received from PWM control circuit 1 to switch between applying or not applying to LEDs 31 and 32 a voltage directed to setting LEDs 31 and 32 in an ON state.

Constant current control circuit 2 adjusts the current flowing through LEDs 31 and 32 when LEDs 31 and 32 are ON to a predetermined current value by the control of the ON state and OFF state of transistor M1.

Voltage conversion circuit 3 includes a transistor M1 to generate a direct-current voltage VOUT directed to setting LEDs 31 and 32 in an ON state from an alternating voltage VIN by alternately switching transistor M1 to an ON state and an OFF state.

In addition, 3-terminal regulator (voltage conversion circuit) 4 converts direct-current voltage VOUT generated by voltage conversion circuit 3 to a predetermined voltage value, which is applied to PWM control circuit 1 as a power supply voltage PS. Such a configuration allows reduction in the circuit scale since the power supply voltage of LEDs 31 and 32 and the power supply voltage of PWM control circuit 1 can be generated by a common voltage conversion circuit 3. 3-terminal regulator 4 converts voltage VON or VOFF to the predetermined voltage level, which is applied to PWM control circuit 1 as power supply voltage PS, independent of whether direct-current voltage VOUT attains the level of voltage VON or VOFF, that will be described afterwards.

At constant current control circuit 2, resistor R1 is connected in series with switch element SW1. Resistor R2 is connected parallel with the series circuit of switch element SW1 and resistor R1. Resistor R3 is connected in series with resistor R2. Resistor R3 is connected in series with a series circuit of switch element SW1 and resistor R1. Current setting resistor RIS is connected between resistor R3 and a ground voltage node VSS to which ground voltage is supplied. The series circuit of resistors R2 and R3 is connected parallel with LEDs 31 and 32. Direct-current voltage VOUT directed to turning on switch element SW1 is supplied to a connection node N3 of LEDs 31 and 32, a series circuit of switch element SW1 and resistor R1, and resistor R2.

Voltage control circuit 11 provides a switching signal to transistor M1 via switching signal transmission circuit 12, based on a voltage VREF at a connection node N1 of resistors R2 and R3 and a voltage VIS at a connection node N2 of resistor R3 and current setting resistor RIS, to control the ON state and OFF state of transistor M1.

Switching signal transmission circuit 12 is, for example, a photocoupler, transmitting the switching signal received from voltage control circuit 11 to a control electrode of transistor M1.

[Operation]

The operation of the driving device according to the first embodiment of the present invention in carrying out dimming control of a light-emitting element will be described hereinafter.

Figure 2A:
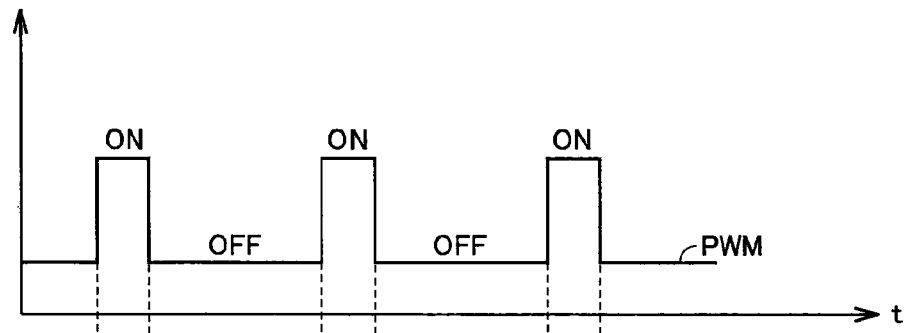
FIG. 2A represents a PWM control signal at the driving device of the first embodiment of the present invention.
Figure 2B:
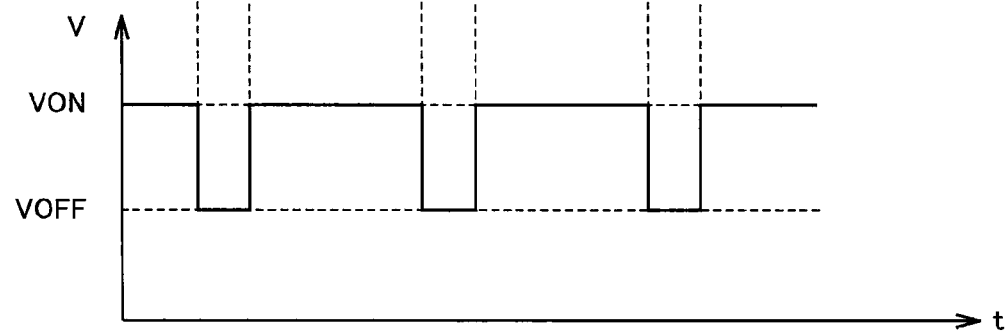
FIG. 2B represents the voltage applied to an LED.

FIG. 2A represents a PWM control signal at the driving device of the first embodiment of the present invention. FIG. 2B represents the voltage applied to an LED.

When the PWM control signal is at a logical high level, LEDs 31 and 32 are OFF since voltage VOFF is applied to the anode of LED 31.

As used herein, the resistance values of resistors R1, R2 and R3 are set sufficiently larger than the resistance value of current setting resistor RIS. Voltage VOFF is represented by the following equation:

$$VOFF \approx ((R2 \times R3/(R1 \times (R2+R3)))+1) \times VREF$$

where R1, R2 and R3 are the resistance values of resistors R1, R2 and R3, respectively.

When the PWM control signal is at a logical low level, LEDs 31 and 32 are ON since voltage VON is applied to the anode of LED 31.

When the resistance values of resistors R1, R2 and R3 are set sufficiently larger than the resistance value of current setting resistor RIS, voltage VON is represented by the following equation:

$$VON \approx (R2/R+1) \times VREF$$

Voltage VON is controlled to be equal to or greater than the total of the forward voltage of LED 31 and the forward voltage of LED 32. Voltage VOFF is controlled to be lower than the total of the forward voltage of LED 31 and the forward voltage of LED 32. In order to reliably turn off LEDs 31 and 32, voltage VOFF is adjusted to be lower than the total of the forward voltages of LEDs 31 and 32 by a predetermined voltage value.

Voltage control circuit 11 controls the ON state and OFF state of transistor M1 such that voltage VREF at connection node N1 attains a predetermined voltage V1. By such a configuration, the ON/OFF control of LEDs 31 and 32 can be carried out stably since the value of voltage VON and voltage VOFF can be adjusted to a constant voltage. Voltage control circuit 11 also controls the ON and OFF state of transistor M1 such that the voltage at connection node N2 attains a predetermined voltage V2 that is lower than predetermined voltage V1. By such a configuration, the current flowing through LEDs 31 and 32 when LEDs 31 and 32 are ON can be adjusted to a constant current.

The frequency of the PWM control signal is set to at least 50 Hz, for example, such that light without perceivable flicker is emitted from LEDs 31 and 32.

The LED driving circuit of Patent Document 1 is disadvantageous in that the luminance and chromaticity of the LED varies since the current flowing through the LED will not be constant even if the dimming voltage is maintained constant, due to variation in the LED property such as the forward voltage and color temperature.

In the driving device according to the first embodiment of the present invention, constant current control circuit 2 adjusts the current flowing through LEDs 31 and 32 when LEDs 31 and 32 are ON to a predetermined current value by the control of the ON state and OFF state of transistor M1. By such a configuration, the current flowing through LEDs 31 and 32 can be set constant even in the case where the property such as the forward voltage and color temperature of LEDs 31 and 32 varies. According to the driving device of the first embodiment, variation in the luminance and chromaticity of the light-emitting element can be suppressed, irrespective of variation in the light-emitting element property.

In the driving device according to the first embodiment of the present invention, the illumination circuit including LEDs 31 and 32, voltage conversion circuit 3, and the like can be integrated with the light dimming circuit including PWM control circuit 1 and the like. By employing a configuration in which the illumination circuit and light dimming circuit are included in one module, the cost can be reduced.

In addition, the driving device according to the first embodiment of the present invention is advantageous in that the flow of inrush current through LEDs 31 and 32 at the moment LEDs 31 and 32 are turned on can be prevented since the current flowing through LEDs 31 and 32 when LEDs 31 and 32 are ON is adjusted to a predetermined current value by voltage control.

Another embodiment of the present invention will be described hereinafter with reference to the drawings. In the drawings, the same or corresponding elements have the same reference characters allotted, and description thereof will not be repeated.

Second Embodiment

The present embodiment relates to a driving device with a light dimming function according to the ambient temperature, as compared to the driving device of the first embodiment. Elements other than those set forth below are similar to the driving device of the first embodiment.

Figure 3:
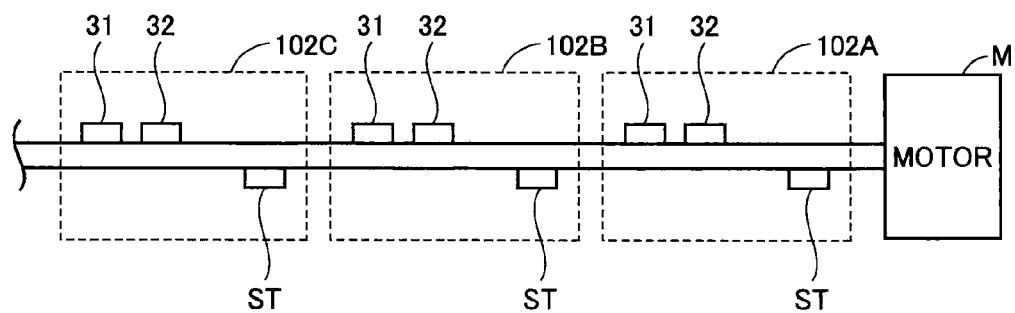
FIG. 3 represents a configuration of an illumination device according to a second embodiment of the present invention.

FIG. 3 represents a configuration of an illumination device according to a second embodiment of the present invention.

Referring to FIG. 3, an illumination device 201 includes a plurality of driving devices 102, and a motor M. In FIG. 3, three driving devices 102A, 102B and 102C, and a plurality of LEDs, corresponding to each driving device 102, are shown as a representative example.

By the heat generated from motor M, LEDs 31 and 32 in a driving device 102A located closest to motor M attain a high temperature. Accordingly, color unevenness will occur at illumination device 201 since the luminance and chromaticity becomes higher as compared to those of the LEDs in other driving devices 102B and 102C, despite the current flowing through LEDs 31 and 32 being adjusted to a predetermined current value by constant current control circuit 2. Moreover, the lifetime of LEDs 31 and 32 at driving device 102A will become shorter.

The driving device according to the second embodiment of the present invention overcomes these problems by a configuration set forth below.

Figure 4:
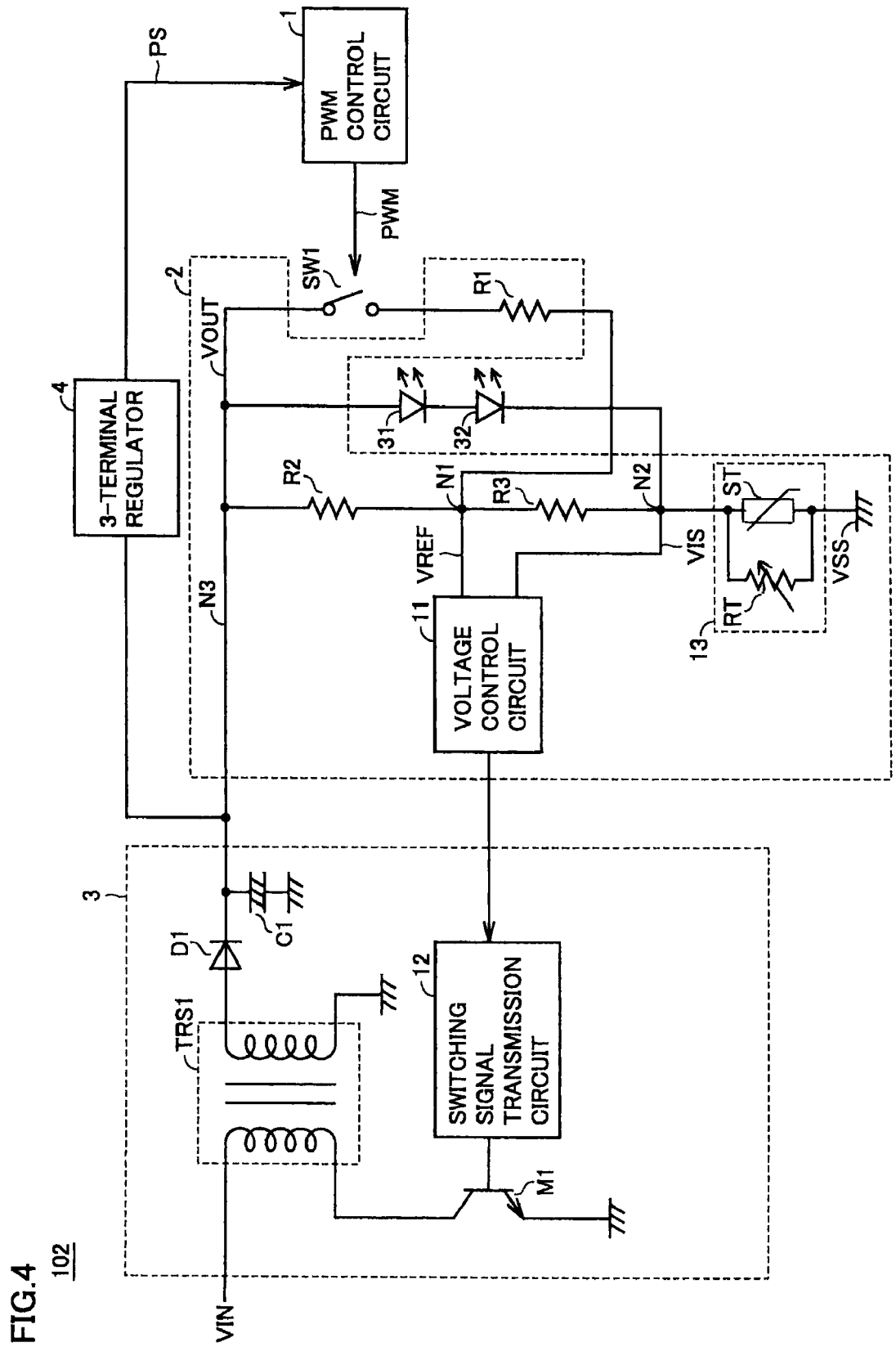
FIG. 4 represents a configuration of a driving device of the second embodiment of the present invention.

FIG. 4 represents a configuration of a driving device of the second embodiment of the present invention.

Referring to FIG. 4, a driving device 102 further includes a light dimming circuit 13, as compared to the driving device of the first embodiment. Light dimming circuit 13 includes a thermistor ST and an adjustment resistor RT.

Thermistor ST is connected between resistor R3 and ground voltage node VSS to which ground voltage is applied. Adjustment resistor RT is connected parallel with thermistor ST between resistor R3 and ground voltage node VSS to which the ground voltage is applied.

Light dimming circuit 13 modifies the value of current flowing through LEDs 31 and 32 according to the ambient temperature. In other words, thermistor ST is characterized in that the resistance value increases as the ambient temperature becomes higher, for example.

Referring to FIG. 3 again, thermistor ST in driving device 102A located closest to motor M has the resistance value increased since the ambient temperature is high. Accordingly, the current flowing through LEDs 31 and 32 will become lower in driving device 102A. Thus, variation in the luminance and chromaticity of LEDs 31 and 32 caused by the high temperature can be suppressed, so that the occurrence of color unevenness at illumination device 201 can be prevented. In addition, the lifetime of LEDs 31 and 32 can be prevented from becoming shorter.

In the case where the resistance value of thermistor ST increases greatly according to the rise in the ambient temperature, the current flowing through LEDs 31 and 32 will be reduced significantly. However, the driving device according to the second embodiment of the present invention is advantageous in that the effect by the increase of the resistance value of thermistor ST, i.e. reduction in the current flowing through LEDs 31 and 32, can be suppressed by adjustment resistor RT.

Specifically, assuming that the voltage applied to thermistor ST is 1V and the resistance value of thermistor ST is 10Ω at the ambient temperature of 25° C., the current flowing through LEDs 31 and 32 will be 100 mA.

Assuming that the resistance value of thermistor ST at the ambient temperature of 80° C. is 20Ω, the current flowing through LEDs 31 and 32 will be 50 mA. In the case where the current reduction of this 50 mA is too great, the current flowing through LEDs 31 and 32 can be adjusted to 96 mA by setting the adjustment resistance RT to 21.7Ω, for example.

By providing such an adjustment resistor RT, the current flowing through LEDs 31 and 32 can be adjusted minutely even in the case where the change in the resistance value of the thermistor caused by increase of the ambient temperature is great. Furthermore, automatic adjustment of the current flowing through LEDs 31 and 32 is allowed without having to use a microcomputer and the like.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A driving device driving a light-emitting element comprising:
   a first switch element to switch between applying or not applying to the light-emitting element a voltage directed to setting the light-emitting element in an ON state;

a constant current control circuit to adjust a current flowing through the light-emitting element to a predetermined current value when the light-emitting element is in an ON state; and a first voltage conversion circuit including a second switch element to generate a direct-current voltage directed to setting the light-emitting element in an ON state from an alternating voltage in response to alternate switching of the second switch element between an ON state and an OFF state, wherein the constant current control circuit adjusts a current flowing through the light-emitting element to a predetermined current value when the light-emitting element is in an ON state by controlling an ON state and an OFF state of the second switch element, the driving device further comprising:

a PWM control circuit to PWM-control an ON state and an OFF state of the first switch element, and a second voltage conversion circuit to convert the direct-current voltage to a predetermined voltage value to be applied to the PWM control circuit as a power supply voltage.

2. A driving device driving a light-emitting element comprising:

a first switch element to switch between applying or not applying to the light-emitting element a voltage directed to setting the light-emitting element in an ON state;

a constant current control circuit to adjust a current flowing through the light-emitting element to a predetermined current value when the light-emitting element is in an ON state; and a first voltage conversion circuit including a second switch element to generate a direct-current voltage directed to setting the light-emitting element in an ON state from an alternating voltage in response to alternate switching of the second switch element between an ON state and an OFF state, wherein the constant current control circuit adjusts a current flowing through the light-emitting element to a predetermined current value when the light-emitting element is in an ON state by controlling an ON state and an OFF state of the second switch element, and wherein the constant current control circuit comprises a first resistor connected in series with the first switch element, a second resistor connected parallel with a series circuit of the first switch element and the said first resistor, a third resistor connected in series with the second resistor, and connected in series with a series circuit of the first switch element and the first resistor, a current setting resistor connected between the third resistor and a node to which a predetermined voltage is applied, and a voltage control circuit controlling an ON state and an OFF state of the second switch element based on a voltage at a first connection node of the second resistor and the third resistor, and a voltage at a second connection node of the third resistor and the current setting resistor, wherein a series circuit of the second resistor and the third resistor is connected parallel with the light-emitting element, and the direct-current voltage generated by the first voltage conversion circuit is supplied to a third connection node of the light-emitting element, the series circuit of the first switch element and the first resistor, and the second resistor.

3. The driving device according to claim 2, wherein said voltage control circuit controls the ON state and OFF state of said second switch element such that the voltage at said first connection node attains a first predetermined voltage, and the voltage at said second connection node attains a second predetermined voltage.

4. The driving device according to claim 2, wherein said current setting resistor is a thermistor.

5. The driving device according to claim 4, wherein said constant current control circuit further includes a resistor connected parallel with said thermistor.

* * * * *